Aug. 25, 1925.                                                            1,551,129
F. J. BAST ET AL
TEMPERATURE RECORDING AND INDICATING INSTRUMENT
Filed Aug. 15, 1924          2 Sheets-Sheet 2
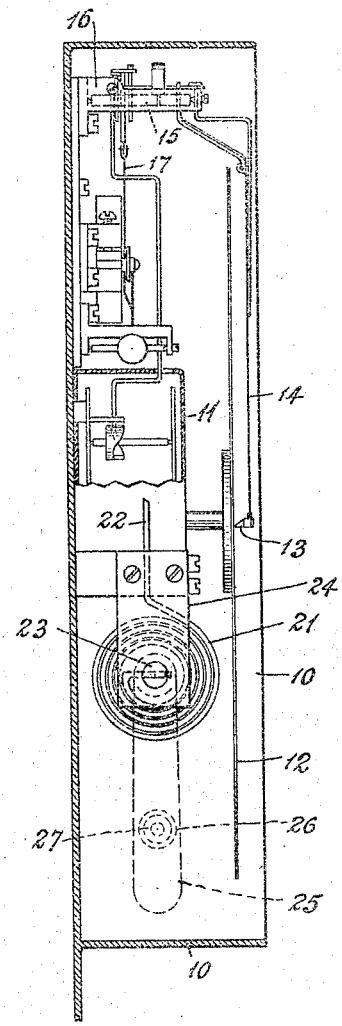
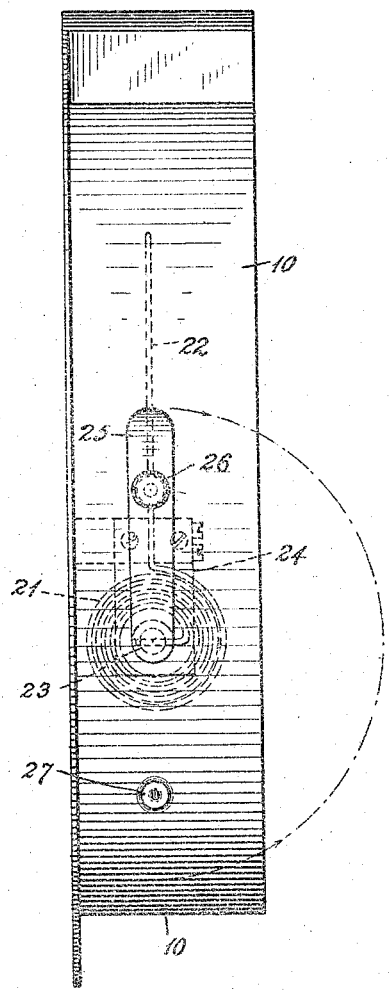
INVENTORS
FRANK J. BAST
FRED KRAMER Patented Aug. 25, 1925.

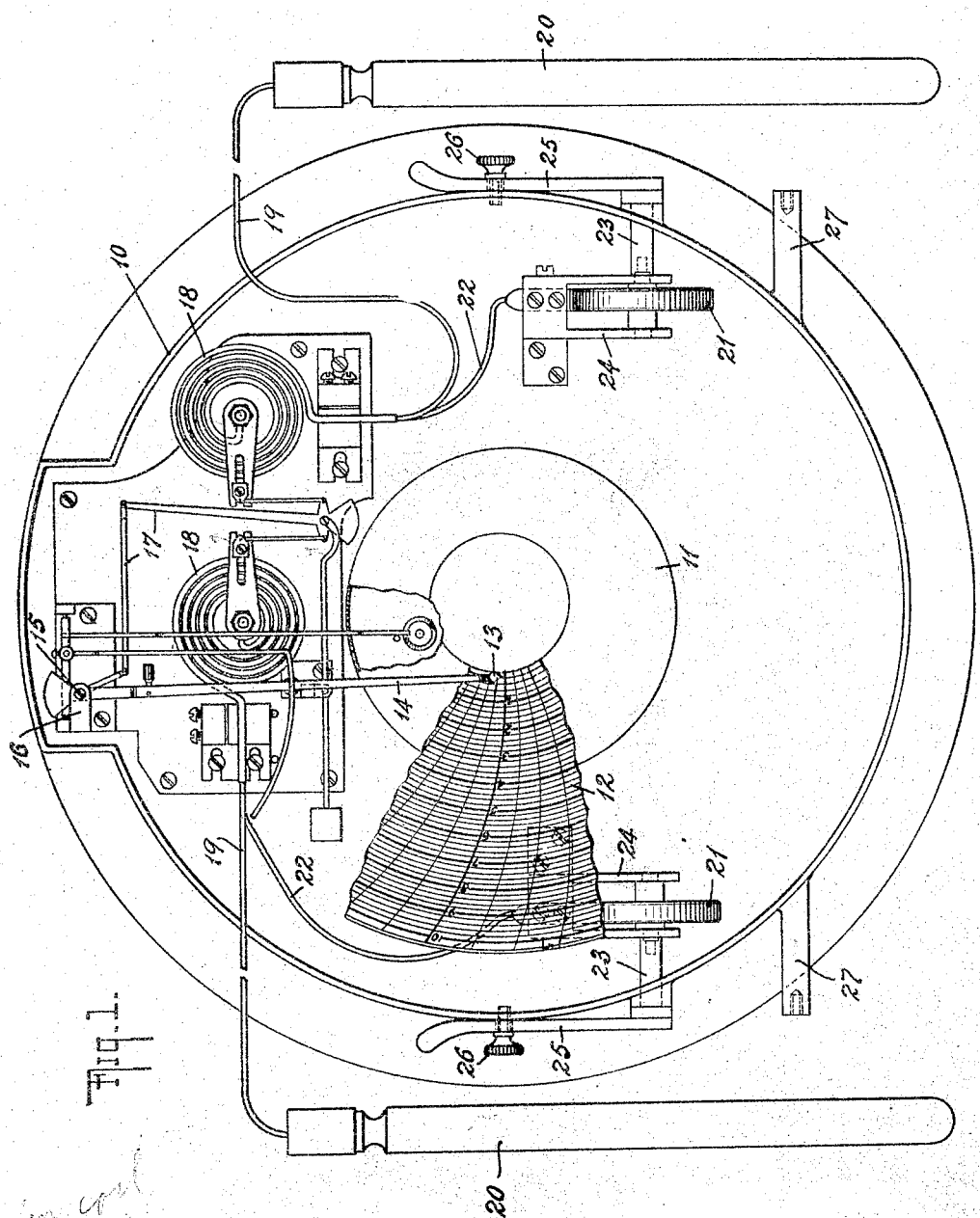

1,551,129

UNITED STATES PATENT OFFICE.

FRANK J. BAST AND FRED KRAMER, OF NEW YORK, N. Y., ASSIGNORS TO CHARLES J. TAGLIABUE MFG. CO., OF BROOKLYN, NEW YORK, A CORPORATION OF NEW YORK.

TEMPERATURE RECORDING AND INDICATING INSTRUMENT.

Application filed August 15, 1924. Serial No. 732,144.

*To all whom it may concern:*

Be it known that we, FRANK J. BAST and FRED KRAMER, both citizens of the United States, and both residents of the borough and county of Queens, city and State of New York, have invented certain new and useful Improvements in Temperature Recording and Indicating Instruments, of which the following is a specification.

The invention relates to temperature recording and indicating instruments and more particularly to that class of such instruments which includes one or more Bourdon springs as part of the thermo-sensitive mechanism. The particular object of the invention is to provide a simple and novel arrangement whereby an instrument of the type referred to, which is adapted for recording and indicating relatively low temperatures will not be disarranged or injured if temporarily subjected to temperatures beyond the maximum temperature for which said instrument is adjusted. Other objects of the invention will appear from the description hereinafter and the features of novelty will be pointed out in the claims.

In the accompanying drawings, which show an example of the invention without defining its limits, Fig. 1 is a face view partly broken away, of one type of temperature recording and indicating instrument with the improvements incorporated therein; Fig. 2 is a sectional view thereof and Fig. 3 is an exterior edge view of said instrument.

The drawings show one form of the invention applied to a temperature recorder and indicator of the differential type in which for instance differences between two independent temperatures are recorded; it will be understood that this is only an example and is not intended to indicate the field of usefulness of the invention.

As shown in the illustrated example, the instrument comprises a casing 10 of conventional form and material and preferably including a suitable glass front which may be movable in a manner to permit access to the interior of the casing. A clockwork 11 of any suitable type is located within the casing 10 and is arranged to rotate a conventional chart 12 in the well known way, said chart constituting the medium upon which a visible record is made by the instrument; the means whereby said record is produced upon said chart comprising the customary pen 13 and pen arm 14. The latter is carried by a suitable spindle 15 mounted in a bracket 16 suitably secured in the casing 10, said spindle being operatively connected by means of a suitable system of levers 17 or their equivalent with one or more thermo-sensitive devices such as spiral or Bourdon springs 18. The latter are mounted in the casing 10 and constitute the means whereby the pen arm 14 and pen 13 are actuated, said springs 18 in turn being connected by means of capillary tubes 19 with thermostatic bulbs 20 which are located in the zones, the temperatures of which are to be recorded. In practice, the springs 18, tubes 19, and bulbs 20 are filled with mercury or other suitable material which expands and contracts in response to temperature variations.

When the instrument is designed to record and indicate relatively low temperatures ranging, for instance, to a maximum of 50° F., it will be obvious that the danger exists that such instruments may be disarranged and the adjustment thereof disturbed if subjected, even temporarily, to temperatures higher than the maximum for which said instrument is intended. Such conditions may arise during shipment or storage of the instrument when the latter would be subjected to average room temperatures which, generally speaking, would be higher than 50° F. or other relatively low maximum, for which the instrument is adjusted. To prevent such disarrangement and disturbance of the instrument under such conditions, we have provided neutralizing means whereby expansion of the mercury or other liquid in the springs, tubes, and bulbs beyond the maximum for which the instrument is designed will be absorbed and neutralized without injury to the springs 18 or their equivalent and without otherwise disturbing the adjustment of said instrument. In the illustrated example, the neutralizing means comprises auxiliary thermo-sensitive devices, such as spiral or Bourdon springs 21, located, for instance, at convenient points within the casing 10 and connected with the main springs 18 or their equivalent through the medium of auxiliary capillary tubes 22. In order that the aforesaid neutralizing means may be rendered active or inactive at will, the auxiliary springs 21 have their inner ends in fixed connection with members 23, rotatably mounted in brackets 24 suitably secured in the casing 10 or at any other convenient points. By means of the members 23, the auxiliary springs 21 are wound to an inoperative condition when their neutralizing functions are not desired and unwound to operative conditions, when excess temperature pressures created in the mercury or its equivalent are to be absorbed. To facilitate the adjustment of the auxiliary springs 21 to and from their different positions, the members 23 may be provided with arms or levers 25 as shown in Figs. 2 and 3. Locking devices may be provided for locking said levers 25 and consequently said auxiliary springs 21 in their adjusted positions, said locking devices, in the illustrated example, comprising screws 26 mounted upon said levers. In one position of said levers 25, the screws 26 screw directly into the casing 10, while in another position thereof, said screws are arranged for screwthread connection with lugs 27 provided upon said casing at the proper points.

When the instrument is in its operative condition for recording temperatures up to the maximum for which it is set, the levers 25 occupy the position shown by dotted lines in Fig. 2 in which position, said levers are locked by connection of the screws 26 with the lugs 27; in this position of the parts, the auxiliary springs 21 are wound and incapable of performing their functions and consequently have no operative effect in combination with the main springs 18. The latter accordingly operate in harmony with physical changes in the mercury induced by temperature changes at the bulbs 19 and actuate the pen arm 14 and pen 13 to record such changes on the chart 12.

If the instrument either in transit or in storage or under any other conditions is to be subjected to temperatures beyond the maximum for which it is adjusted, the members 23 are rotated through the medium of the levers 25 to unwind the auxiliary springs 21 and to bring them to an operative condition, responsive to expansion pressures of the mercury or other fluid; the levers 25 under such conditions occupy the positions indicated in Figs. 1 and 3 in which they are locked by connecting the screws 26 with the casing 10 as shown. With this adjustment of the parts, as the mercury or its equivalent expands by the action of the temperatures beyond the instrument's maximum, the excess fluid will pass through the auxiliary capillary tubes 22 into the auxiliary springs 21 or their equivalent. The latter will thus accommodate this excess fluid and absorb the excess pressures created thereby, so that the latter do not influence the main springs 18 or their equivalent and the effects of such excess pressures, so far as said main springs 18 are concerned, are neutralized.

It will be obvious that by a simple manipulation of the levers 25 the instrument may be adjusted to respond, without disturbance or disarrangement of its adjustment, to conditions existing because of temperatures in excess of its intended maximum. Injury to the main springs 18 or their equivalent because of excess internal pressures therein and consequent interference with the accuracy of the instrument is thus positively avoided. The invention is capable of operative combination with any type of instrument which includes an element adapted to expand and contract in accordance with temperature variations and provides a novel and simple means for protecting such element against injurious distortion.

Various changes in the specific form shown and described may be made within the scope of the claims without departing from the spirit of our invention.

We claim:

1. The combination of thermo-sensitive operating means adjusted for a predetermined maximum temperature, an auxiliary means whereby effects of temperatures in excess of said maximum upon said thermo-sensitive means are neutralized and a device for positively locking the auxiliary means in a completely inoperative position at will without interfering with the predetermined operation of the thermo-sensitive operating means.

2. The combination of thermo-sensitive operating means adjusted for a predetermined maximum temperature, an auxiliary thermo-sensitive device connected with said thermo-sensitive means and arranged to absorb the effects of temperatures in excess of said maximum and a device for positively locking the auxiliary thermo-sensitive device in a completely inoperative position at will without interfering with the predetermined operation of the thermo-sensitive operating means.

3. The combination of thermo-sensitive operating means adjusted for a predetermined maximum temperature, an auxiliary thermo-sensitive device connected with said thermo-sensitive means and arranged to absorb the effects of temperatures in excess of said maximum, and an adjusting device for selectively locking said auxiliary thermo-sensitive device in a completely inoperative position without interfering with the predetermined operation of the thermo-sensitive operating means.

4. The combination of a main Bourdon spring constituting a thermo-sensitive operating device and adjusted for a predetermined maximum temperature, an auxiliary Bourdon spring connected with said main spring and arranged to absorb excess pressures created by temperatures in excess of said predetermined temperature and means for positively locking said auxiliary spring in a completely inoperative position at will without interfering with the predetermined operation of said main Bourdon spring.

5. The combination of a pair of opposed main Bourdon springs constituting thermo-sensitive actuating devices and adjusted for predetermined maximum temperatures, auxiliary Bourdon springs connected with said main springs and arranged to absorb excess pressures created by temperatures in excess of said maximum and levers whereby said auxiliary springs may be wound to positively lock the same in an inoperative position at will without interference with the predetermined operation of said main Bourdon springs.

6. The combination of a main Bourdon spring constituting a thermo-sensitive operating device and adjusted for a predetermined maximum temperature, an auxiliary Bourdon spring connected with said main spring and arranged to absorb excess pressures created by temperatures in excess of said predetermined temperature and a lever connected with said auxiliary spring for winding the same to a completely inoperative position and for unwinding the same to an operative position.

7. The combination of a main Bourdon spring constituting a thermo-sensitive operating device and adjusted for a predetermined maximum temperature, an auxiliary Bourdon spring connected with said main spring and arranged to absorb excess pressures created by temperatures in excess of said predetermined temperature, a lever connected with said auxiliary spring for winding the same to a completely inoperative position and for unwinding the same to an operative position, and means for locking said lever in either of its positions.

In testimony whereof we have hereunto set our hands.

FRANK J. BAST.
FRED KRAMER.